US008332598B2

(12) United States Patent
Akiyama et al.

(10) Patent No.: US 8,332,598 B2
(45) Date of Patent: Dec. 11, 2012

(54) MEMORY MICRO-TILING REQUEST REORDERING

(75) Inventors: James Akiyama, Beaverton, OR (US); William H. Clifford, Gig Harbor, WA (US); Paul M. Brown, University Place, WA (US)

(73) Assignee: Intel Corporation, Santa Clara, CA (US)

( * ) Notice: Subject to any disclaimer, the term of this patent is extended or adjusted under 35 U.S.C. 154(b) by 1471 days.

(21) Appl. No.: 11/159,741

(22) Filed: Jun. 23, 2005

(65) Prior Publication Data

US 2006/0294328 A1 Dec. 28, 2006

(51) Int. Cl.
*G06F 12/00* (2006.01)

(52) U.S. Cl. ................................. 711/158; 711/E12.002

(58) Field of Classification Search .................... 711/158
See application file for complete search history.

(56) References Cited

U.S. PATENT DOCUMENTS

| | | | | |
|---|---|---|---|---|
| 3,323,109 | A | * | 5/1967 | Hecht et al. .................... 711/151 |
| 3,988,717 | A | * | 10/1976 | Kisylia ............................ 712/43 |
| 4,051,461 | A | * | 9/1977 | Hashimoto et al. ........... 711/118 |
| 4,059,850 | A | * | 11/1977 | Van Eck et al. ................ 711/136 |
| 4,124,891 | A | | 11/1978 | Weller, III et al. |
| 4,495,570 | A | | 1/1985 | Kitajima et al. |
| 4,504,902 | A | | 3/1985 | Gallaher et al. |
| 5,251,310 | A | * | 10/1993 | Smelser et al. ................ 711/144 |
| 5,325,510 | A | | 6/1994 | Frazier |
| 5,412,662 | A | | 5/1995 | Honma et al. |
| 5,459,842 | A | | 10/1995 | Begun et al. |
| 5,526,507 | A | | 6/1996 | Hill |
| 5,649,157 | A | | 7/1997 | Williams |
| 5,748,554 | A | | 5/1998 | Barth et al. |
| 5,752,045 | A | | 5/1998 | Chen |
| 5,761,708 | A | | 6/1998 | Cherabuddi et al. |
| 5,790,118 | A | * | 8/1998 | Bertram ......................... 715/744 |
| 5,901,332 | A | | 5/1999 | Gephardt |
| 5,905,725 | A | | 5/1999 | Sindhu et al. |
| 5,913,231 | A | | 6/1999 | Lewis et al. |
| 6,061,773 | A | * | 5/2000 | Harvey et al. ................. 711/206 |
| 6,076,139 | A | | 6/2000 | Welker et al. |

(Continued)

FOREIGN PATENT DOCUMENTS

DE 3689276 T2 8/1993

(Continued)

OTHER PUBLICATIONS

Webopedia, "Main Memory", Jan. 15, 2002, pp. 1-4 http://www.webopedia.com/TERM/m/main_memory.html.*

(Continued)

*Primary Examiner* — Edward Dudek, Jr.
*Assistant Examiner* — Christopher Birkhimer
(74) *Attorney, Agent, or Firm* — Blakely, Sokoloff, Taylor & Zafman LLP (57) ABSTRACT

According to one embodiment, a memory controller is disclosed. The memory controller includes assignment logic, a reorder table and a transaction assembler. The assignment logic receives a request to access a memory channel and assigns the request to access one of two or more independently addressable subchannels within the channel. The reorder table includes two or more table elements. Each table element includes a shared address component and an independent address component corresponding to each of the two or more independently addressable subchannels. The transaction assembler combines the shared and independent address components in a reorder table element and issue a single memory transaction.

15 Claims, 9 Drawing Sheets

U.S. PATENT DOCUMENTS

| | | | |
|---|---|---|---|
| 6,108,725 A | | 8/2000 | Chatter |
| 6,122,709 A | * | 9/2000 | Wicki et al. ............... 711/118 |
| 6,145,065 A | * | 11/2000 | Takahashi et al. ............ 711/158 |
| 6,151,641 A | | 11/2000 | Herbert |
| 6,249,851 B1 | * | 6/2001 | Richardson et al. .......... 711/167 |
| 6,389,488 B1 | | 5/2002 | Strongin et al. |
| 6,430,672 B1 | | 8/2002 | Dhong et al. |
| 6,438,675 B1 | | 8/2002 | Root et al. |
| 6,453,380 B1 | | 9/2002 | Van Lunteren |
| 6,606,688 B1 | | 8/2003 | Koyanagi et al. |
| 6,643,746 B1 | | 11/2003 | Bouquet |
| 6,651,151 B2 | | 11/2003 | Palanca et al. |
| 6,708,248 B1 | | 3/2004 | Garrett, Jr. et al. |
| 6,745,272 B2 | | 6/2004 | Owen et al. |
| 6,820,181 B2 | | 11/2004 | Jeddeloh et al. |
| 6,851,030 B2 | | 2/2005 | Tremaine |
| 6,862,672 B1 | | 3/2005 | Furudate et al. |
| 7,006,505 B1 | | 2/2006 | Bleszynski et al. |
| 7,043,617 B2 | | 5/2006 | Wiliams |
| 7,130,229 B2 | | 10/2006 | Dahlen et al. |
| 2002/0078268 A1 | | 6/2002 | Lasserre |
| 2002/0188858 A1 | | 12/2002 | Oerlemans |
| 2003/0056058 A1 | | 3/2003 | Veitch |
| 2003/0142102 A1 | | 7/2003 | Emberling |
| 2003/0179598 A1 | | 9/2003 | Chen |
| 2003/0191915 A1 | | 10/2003 | Saxena |
| 2003/0204679 A1 | | 10/2003 | Blankenship |
| 2003/0225970 A1 | | 12/2003 | Hashemi |
| 2003/0229821 A1 | | 12/2003 | Ma |
| 2004/0044857 A1 | * | 3/2004 | Jeddeloh et al. ............... 711/154 |
| 2004/0078532 A1 | * | 4/2004 | Tremaine ..................... 711/160 |
| 2004/0142102 A1 | | 7/2004 | Banerjee et al. |
| 2004/0193829 A1 | | 9/2004 | Woo et al. |
| 2005/0068844 A1 | | 3/2005 | Roohparvar |
| 2005/0080953 A1 | | 4/2005 | Oner et al. |
| 2005/0193293 A1 | | 9/2005 | Shikata |
| 2006/0294264 A1 | | 12/2006 | Akiyama et al. |
| 2006/0294328 A1 | | 12/2006 | Akiyama et al. |

FOREIGN PATENT DOCUMENTS

| | | |
|---|---|---|
| DE | 10216611 A1 | 11/2003 |
| EP | 1001347 | 5/2000 |
| JP | 02067622 | 3/1990 |
| JP | 06095959 | 4/1994 |

OTHER PUBLICATIONS

U.S. Appl. No. 11/165,390, filed Jun. 23, 2005, Akiyama et al.
U.S. Appl. No. 11/159,745, filed Jun. 23, 2005, Akiyama et al.
Office Action U.S. Appl. No. 11/165,390, mailed May 29, 2008, 1-11.
Office Action U.S. Appl. No. 11/172,766, mailed May 27, 2008.
Imagination Technologies, "POWERVR MBX—Technology Overview", Version 1.5f, May 6, 2009, Copyright 2009 Imagination Technologies Ltd., 17 pages.
"IA-32 Intel Architecture Software Developer's Manual", vol. 3: *System Programming Guide*, 9-1-9-3.
Abdo, Sharif, "Cache Memory", http://searchstorage.techtarget.com/sDefinition/0,,sid5_gci211730,33.html, (Oct. 26, 2004), 1-3.
Srikanth, "Cache Memory", http://web.archive.org/web/20000713053339/http://www.newton.dep.anl.gov/askasci/com . . . (Jun. 19, 2009), 2 pages.

* cited by examiner

MEMORY MICRO-TILING REQUEST REORDERING

FIELD OF THE INVENTION

The present invention relates to computer systems; more particularly, the present invention relates to accessing memory control.

BACKGROUND

Computer systems implementing Unified Memory Architecture (UMA) feature a graphics controller that accesses main memory for video memory. However, the memory efficiency of UMA graphics systems may be limited due to CPU cache line size requirements. For example, the ideal memory access size for graphics may be 4 to 16 bytes, since graphics controllers can operate on one or a few pixels or texels at a time. Nevertheless, memory architectures are often optimized for the 64 byte CPU cache line size to optimize CPU memory efficiency. The result is that, on average, a significant amount of data read from memory may never used by the graphics controller.

Manufacturers of discrete graphics controllers minimize this over fetch by using narrower memory channels. This solution, however, is not available for UMA-based integrated graphics controllers.

BRIEF DESCRIPTION OF THE DRAWINGS

The invention is illustrated by way of example and not limitation in the figures of the accompanying drawings, in which like references indicate similar elements, and in which.

DETAILED DESCRIPTION

A memory request reordering architecture is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
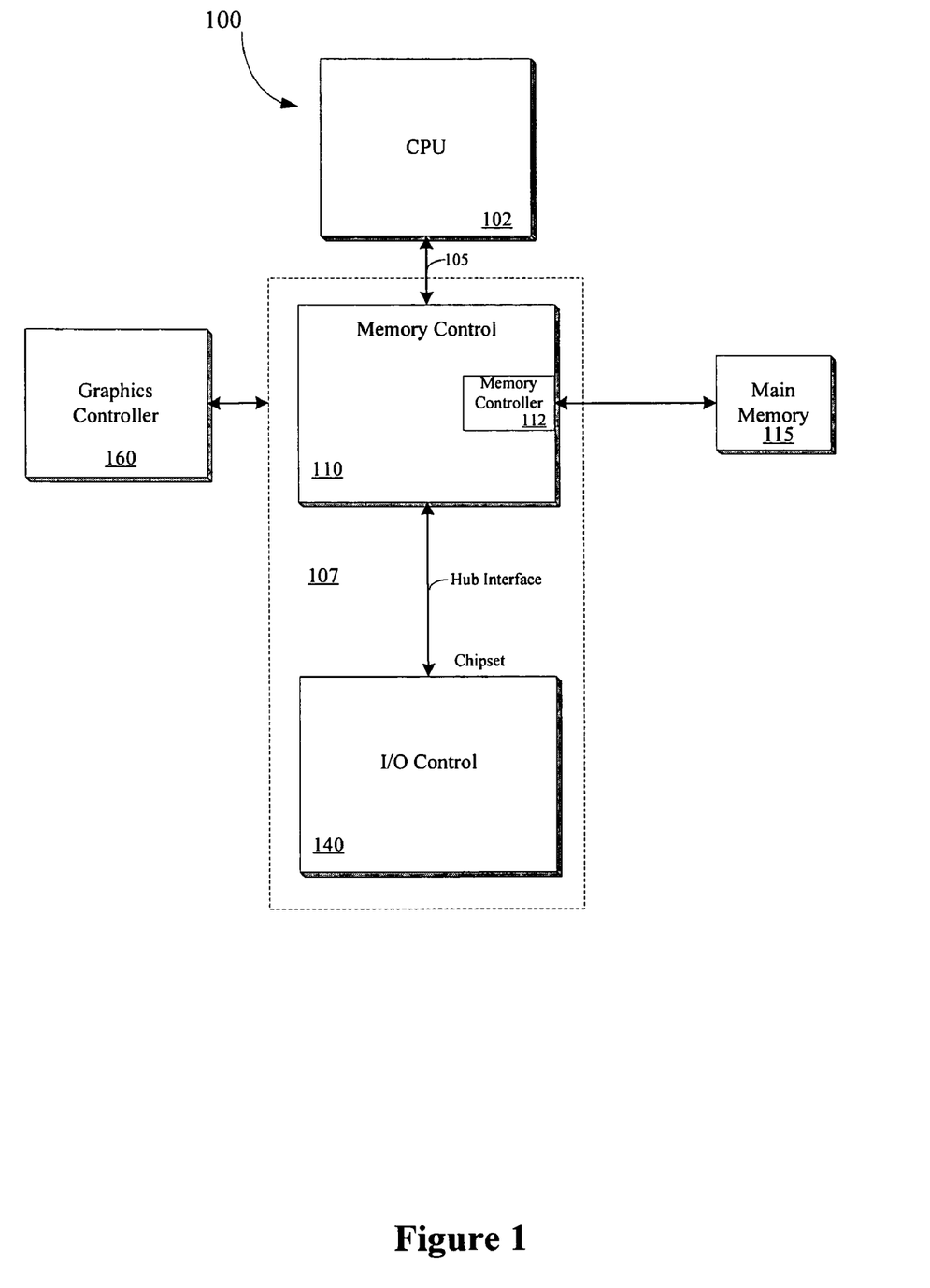
FIG. 1 is a block diagram of one embodiment of a computer system.

FIG. 1 is a block diagram of one embodiment of a computer system 100. Computer system 100 includes a central processing unit (CPU) 102 coupled to an interface 105. In one embodiment, CPU 102 is a processor in the Pentium® family of Pentium® IV processors available from Intel Corporation of Santa Clara, Calif. Alternatively, other CPUs may be used. For instance, CPU 102 may be implemented using multiple processing cores. In yet other embodiments, computer system 100 may include multiple CPUs 102

In a further embodiment, a chipset 107 is also coupled to interface 105. Chipset 107 includes a memory control component 110. Memory control component 110 may include a memory controller 112 that is coupled to a main system memory 115. Main system memory 115 stores data and sequences of instructions that are executed by CPU 102 or any other device included in system 100. In one embodiment, main system memory 115 includes dynamic random access memory (DRAM); however, main system memory 115 may be implemented using other memory types. Additional devices may also be coupled to interface 105, such as multiple CPUs and/or multiple system memories.

Memory control component 110 may be coupled to an input/output (I/O) control component 140 via an interface. I/O control component 140 provides an interface to I/O devices within computer system 100. I/O control component 140 may support standard I/O operations on I/O busses such as peripheral component interconnect (PCI), accelerated graphics port (AGP), universal serial bus (USB), low pin count (LPC) bus, or any other kind of I/O bus (not shown).

According to one embodiment, graphics controller 160 is coupled to chipset 107 and is implemented to provide video graphics to a display monitor (not shown) coupled to computer system 100. Graphics controller 160 accesses main memory 115 for video memory. As discussed above, the memory efficiency of memory device supporting both a graphics system and a CPU is limited since memory access size for graphics is often ideally 4 to 16 bytes, while memory architectures are optimized for the 64 byte CPU line size to optimize CPU memory efficiency.

According to one embodiment, memory control component 110 features reduces memory request size for graphics devices, while maintaining 64 byte memory transactions. A standard memory channel, such as based on DDR DRAM technology, has some physical width of m bits. A memory transaction may be composed of T transfers for a total logical width of M=m*T/8 bytes. The bytes within each transaction are considered to have consecutive addresses. In subsequent discussion, the term width means the logical width.

Micro-Tiling breaks the M byte wide channel into S subchannels that are each N=M/S bytes wide and where N bytes of data are transferred on each subchannel. An address may be presented to each subchannel, in which some number, I, of independent address bits may be different from corresponding bits in the addresses presented to the other subchannels. The data transferred on each subchannel may be considered to represent a contiguous address range. However, the blocks of data on each subchannel are not necessarily from a contiguous address range. Each subchannel includes a subset of the total memory locations of the channel.

Figure 2:
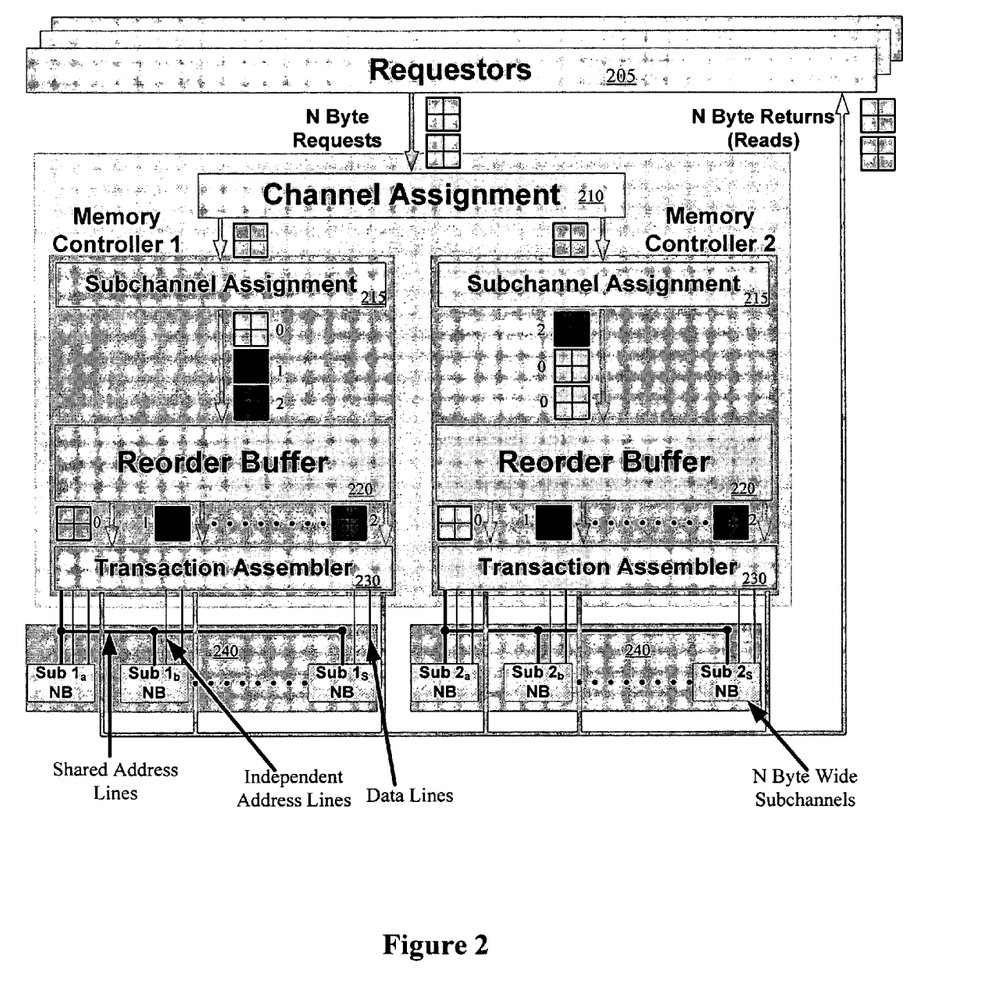
FIG. 2 illustrates one embodiment of a memory controller.

FIG. 2 illustrates one embodiment of a memory controller 110. In one embodiment, a multi-channel memory subsystem has a Micro-Tiling memory controller per channel. Thus, as illustrated in FIG. 2, memory control component 110 includes two memory controllers 112 (memory controllers 1 and 2) for each of the two channels. Each channel includes S subchannels, each N bytes wide. Thus each channel may be M=N*S bytes wide.

In this figure, requests to read or write memory are depicted as 2×2 arrays of squares possibly representing a 2×2 array of pixels or texels. Requests are shown before being assigned to a subchannel. After subchannel assignment, requests are numbered 0-(S−1) to suggest subchannel assignment. The N byte returns to requester 205 coupled to memory control component 110 occur in the case of a read transaction.

Memory control component 110 includes channel assignment logic 210 coupled to memory controllers 112. Channel assignment 210 assigns each request received from requestor 205 to a memory channel 240 via a memory controller 112. Further, each memory controller 112 includes subchannel assignment 215, reorder buffer 220 and transaction assembler 230. Thus, requests are assigned to memory controller 1 or memory controller 2 shown in FIG. 2.

Subchannel assignment 215 assigns each request to a subchannel within a memory channel 240. Reorder buffer 220 collects requests to enable transaction assembler 230 to attempt to assemble memory accesses for each memory 240 subchannel. According to one embodiment, each subchannel has an equal N byte width.

During operation of the system shown in FIG. 2, a request to read or write a block of N bytes of data at address A enters a memory controller (1 or 2) may be assigned to a subchannel and may be placed in a reorder buffer 220. In one embodiment, the Identity Subchannel Assignment, s, may be defined by the following process: the request address, A, is shifted right by $P=\log_2(N)$ bits, resulting in a new integer value $\tilde{A}$ (e.g., $\tilde{A}=A>>P$); and s is the least significant $Q=\log_2(S)$ bits of $\tilde{A}$ (e.g., $s=\tilde{A}\ \&\ ((1<<Q)-1))$.

The memory controller forms a memory read transaction by selecting S read requests, one for each subchannel from the reorder buffer 220. The memory controller forms a memory write transaction by selecting S write requests, one for each subchannel, from reorder buffer 220. The portion of the address represented by shared address lines may be the same for all subchannel requests in the transaction.

Figure 3:
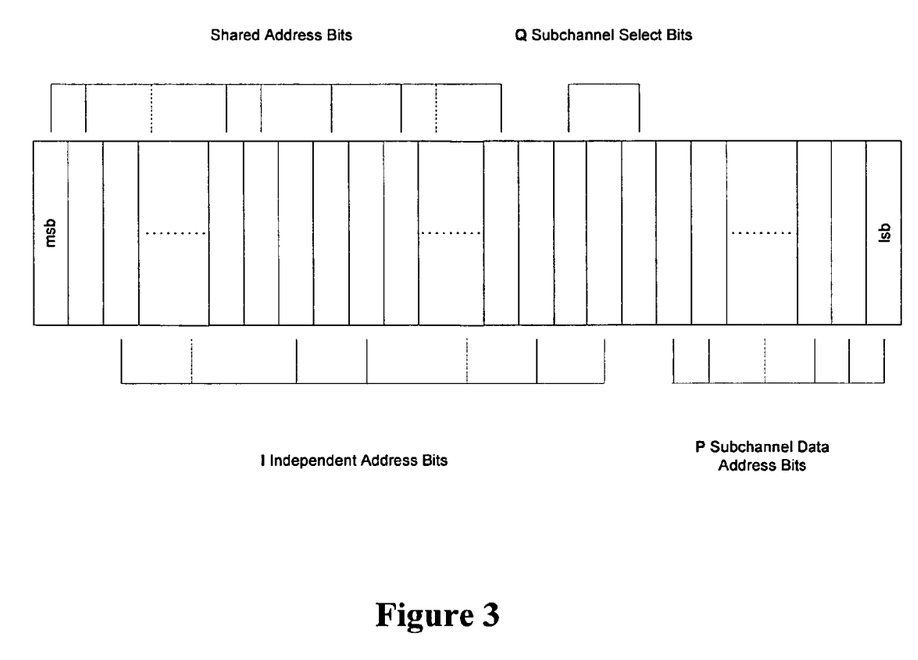
FIG. 3 illustrates one embodiment of a logical virtual address.

FIG. 3 illustrates one embodiment of an interpretation of address bits in a physical address. The choice of shared and independent address bits, and subchannel select bits shown in FIG. 3 is for illustrative purposes since the division of the address bits above the P subchannel data address bits into shared and independent address bits, and subchannel select bits may be arbitrary. The independent address bits are different across subchannels, and are not necessarily contiguous. The address bits sent to a subchannel are the shared address bits and the independent address bits of that subchannel.

Figure 4:
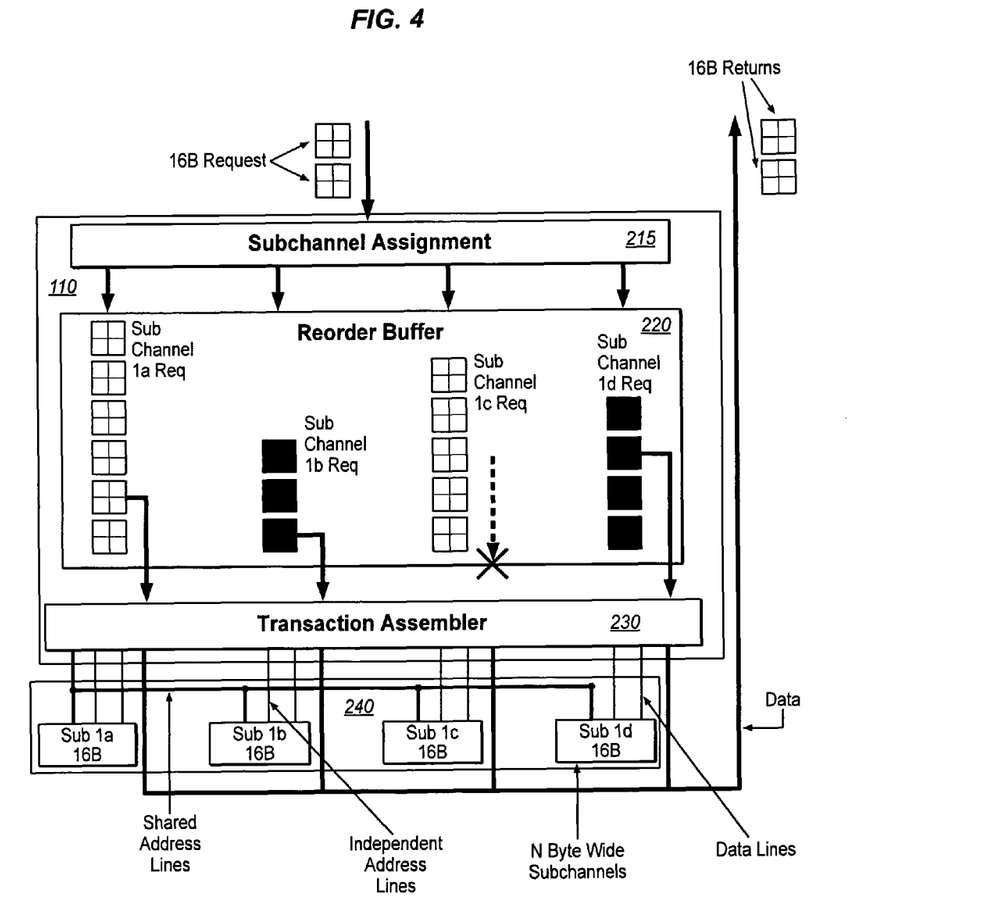
FIG. 4 illustrates another embodiment of a memory controller.

FIG. 4 illustrates an embodiment of memory control component 110 assembling a 64 byte transaction from four 16 byte requests with only a single channel being shown. FIG. 4 shows reorder buffer 220 implemented as a reorder queue for each subchannel. However, in other embodiments, reorder buffer 220 may be implemented via other mechanisms.

In this embodiment, transaction assembler 230 constructs a 64 B memory request from 16 B requests, one for each subchannel. All 16 B requests forming the memory request have the same shared address bits. Thus assembler 230 looks into the queue for requests that can be assembled into a single transaction based upon whether requests have a common shared address.

Note that in the embodiment shown in FIG. 4, assembler 230 cannot find a request for subchannel 1*c*. When attempting to form a transaction, the memory controller may not be able to find a request for each subchannel such that all have the same shared address segment (e.g., such that the value of each shared address bit is the same across all requests).

If a subchannel cannot be filled by a request in the corresponding queue, the effect is that no transfer may be performed from/to that subchannel. In one embodiment, if a subchannel cannot be filled by a request an arbitrary location may be read and the results are discarded. In an alternative embodiment, an additional control line may be included per subchannel, which may be used to power down a subchannel when there is no corresponding request to that channel.

In the above-described embodiment, transaction assembler 230 assembles a channel request by selecting a subchannel request from each of the reorder queues. However, in an alternative embodiment, a reorder table may be implemented to store the subchannel requests, rather than a separate reorder queue associated with each subchannel.

Figure 5:
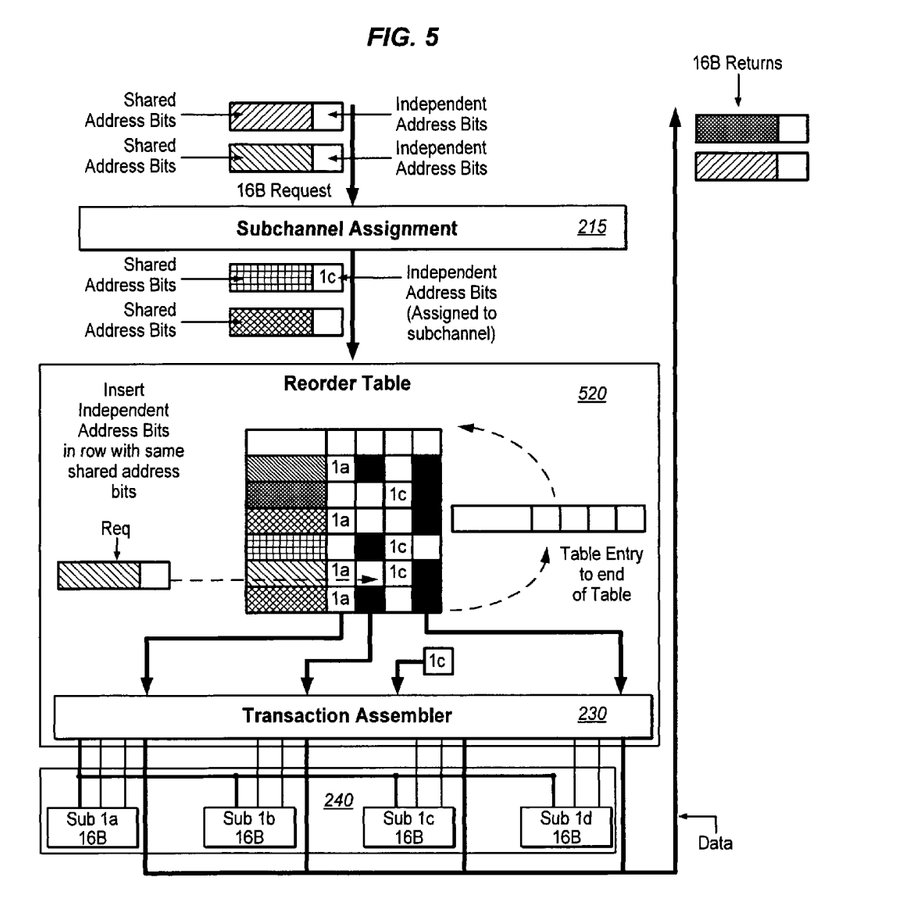
FIG. 5 illustrates yet another embodiment of a memory controller.

FIG. 5 illustrates an embodiment of memory control component 110 with a flow of requests through a reorder table 520. In this embodiment, a request may be represented as including a shared address component and an independent address component. The shared address components are patterned in FIG. 5 to suggest different or same values. The independent address component of a request may be blank before a subchannel is assigned. In one embodiment, the $\log_2(N)$ Subchannel Data Address Bits are not relevant to memory transactions at this level and are thus not represented. Similarly, the actual data transferred may be not represented.

The table elements of reorder table 520 each have a shared address component and S independent address components, one corresponding to each of the subchannels. As shown in FIG. 5, a table element is blank to indicate that a shared address value is not yet assigned. Each independent address component may be also blank until an independent address value is assigned.

After subchannel assignment, the independent address component of a request may be labeled in FIG. 5 to indicate the subchannel to which it is assigned (e.g., 1*a* for subchannel 1*a*, 1*b* blue for subchannel 1*b*, etc.). The shared address value may be then compared to the shared address value stored in each table entry. If there is a match and the corresponding subchannel address component in the table entry is available, the independent address value may be placed in that subchannel address component. If the subchannel address component already includes a value, the search continues for a table entry with a matching shared address value. If the search fails, the shared and independent address values of the request are placed in an empty table entry.

FIG. 5 shows a specific example where there are S=4 subchannels, and where the maximum table depth, D=8. Both S and D can assume any value, creating a large number of possible configurations for reorder table 520. To issue a transaction, a table entry may be selected and forwarded to transaction assembler 230, and then returned as an empty table entry to reorder table 520 for future use.

According to one embodiment, assembler 230 constructs a 64 byte memory request from 16 byte requests on one reorder table 520 row, with all subspans having the same shared address bits. Further, if a subchannel component in the selected table entry is empty, transaction assembler 230 can speculatively insert a subspan request for memory reads.

Figure 6:
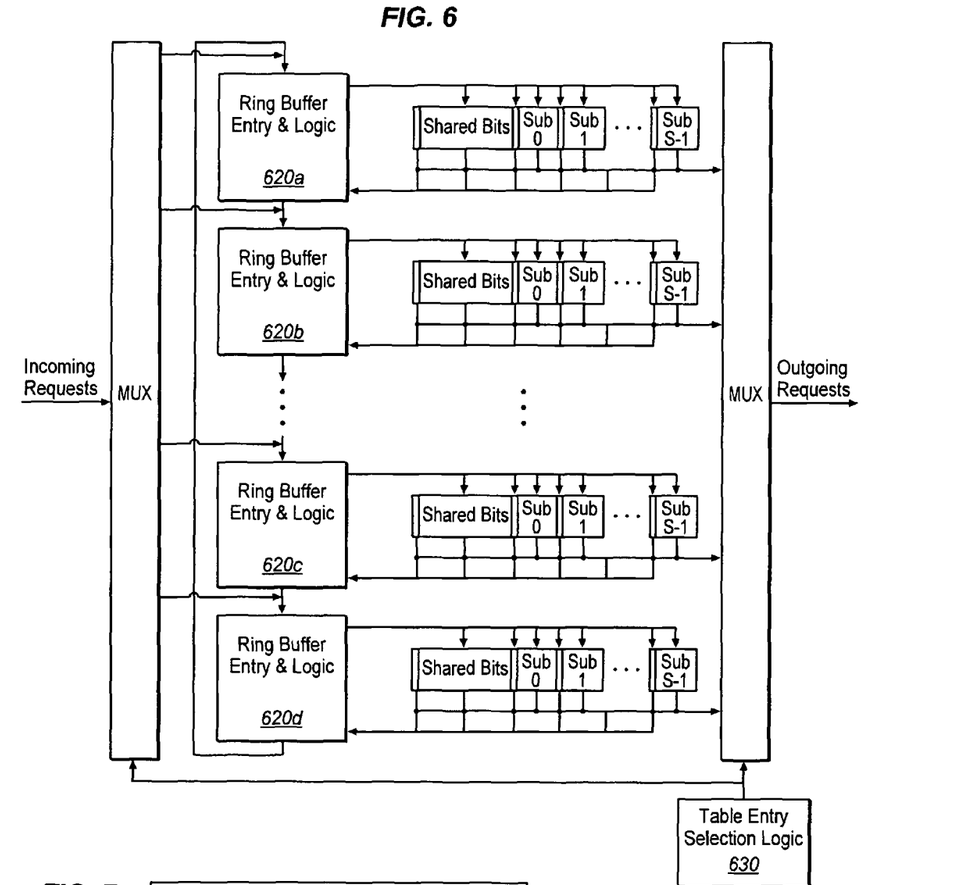
FIG. 6 illustrates one embodiment of a reorder table.
Figure 7:
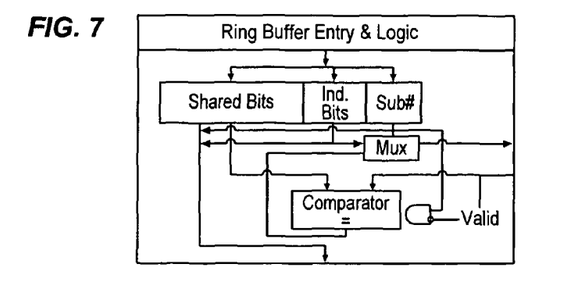
FIG. 7 illustrates one embodiment of ring buffer entry and logic.

FIG. 6 illustrates one embodiment of a reorder table 520 implementing such a mechanism. Reorder table 520 includes a ring of comparator logic units referred to as ring buffer entry and logic 620. FIG. 7 illustrates one embodiment of ring buffer entry and logic 620.

Referring back to FIG. 6, a table entry may be represented as a register capable of storing a single shared address value and an independent address value for each subchannel. The table entries may be implemented as a series of registers, with valid bits to indicate if the current stored value is valid. Output requests are generated by selecting a table entry and issuing it to transaction assembler 230. The corresponding table entry components are then marked as invalid.

According to one embodiment, each table entry may be coupled to a logic unit 620. Further, each incoming request may be inserted into the ring at a logic unit 620 associated with the next table entry, as selected by table entry selection logic 630, to be delivered to transaction assembler 230. An incoming request, including a shared address value, an independent address value and a subchannel assignment, may be compared with the associated table entry as follows.

First, if the shared address value in the table entry is not valid, the shared address value in the request may be copied to the table entry, the independent address value in the request may be copied to the corresponding subchannel address component in the table entry. Both elements of the table entry are marked as valid. The request is then discarded.

However, if the shared address values in the request and table entry are equal and the independent address value of the assigned subchannel in the table entry is not valid, the independent address value in the request may be written to the table entry and marked valid. The request is then discarded. Otherwise, the request is passed to the next successive ring buffer element and the process is repeated. According to one embodiment, if the comparison fails for all ring buffer entries, the incoming request may be stalled until an output request may be generated, thus freeing up a ring buffer entry.

Figure 8:
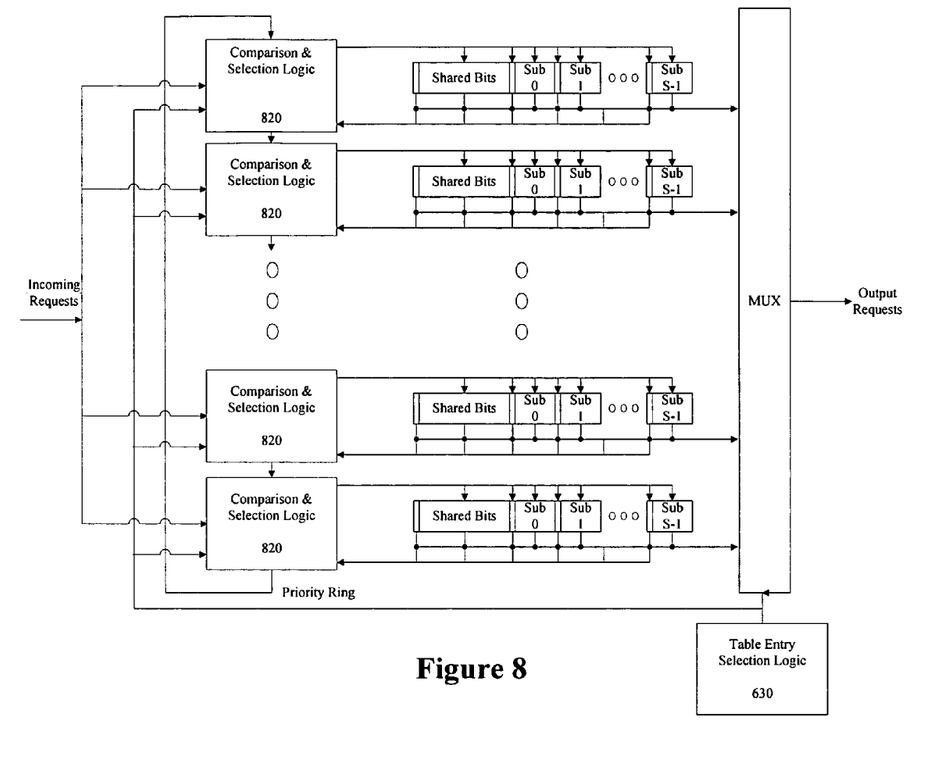
FIG. 8 illustrates another embodiment of a reorder table.
Figure 9:
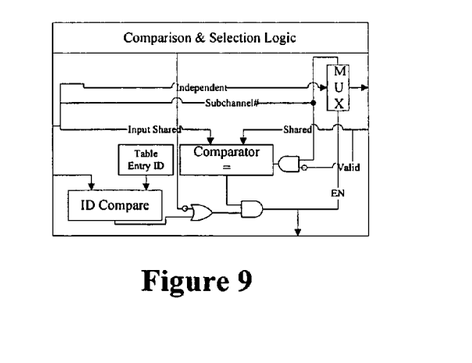
FIG. 9 illustrates one embodiment of comparison and selection logic.

FIG. 8 illustrates another embodiment of a reorder table 520 implementing such a mechanism. Reorder table 520 includes a ring of comparator logic units referred to as comparison and selection logic 820. FIG. 9 illustrates one embodiment of comparison and selection logic 820.

Referring back to FIG. 8, a table entry is represented as a register capable of storing a single shared address value and an independent address value for each subchannel. The table entries may be implemented as a series of registers, with valid bits to indicate if the current stored value is valid. Output requests are generated by selecting the highest priority table entry and issuing it to transaction assembler 230. The corresponding table entry components are then marked as invalid.

According to one embodiment, each table entry is coupled to a logic unit 820. Further, each incoming request is seen by each logic 820 unit. Each logic 820 unit compares the incoming request, including a shared address value, an independent address value and a subchannel assignment, with the associated table entry as follows ("the incoming request compare").

First, if the shared address value in the table entry is not valid, then the compare succeeds. Otherwise, if the shared address values in the request and table entry are equal and the independent address value of the assigned subchannel in the table entry is not valid, then the compare succeeds. Otherwise the compare fails.

In one embodiment, each logic 820 unit has a fixed and unique table entry Id and compares this with the highest priority table entry, as selected by table entry selection logic 630, to be delivered to transaction assembler 230. If the incoming request compare performed by the highest priority entry succeeded, then the shared address value in the request is copied to the table entry, the independent address value in the request is copied to the corresponding subchannel address component in the table entry. Both elements of the table entry are marked as valid. The request is then discarded.

Otherwise, if the incoming request compare performed by the next table entry on the priority ring succeeded then the incoming request is copied to that table entry. Otherwise, this process repeats until a table entry is found for which the incoming request compare succeeded. If a table entry for which the incoming request compare is not found, then insertion of the incoming request is stalled until an output request is generated, thus freeing up a ring buffer entry.

The Micro-Tiling memory subchannels can access discontiguous memory addresses within some address ranges determined by the shared address bits and the I independent address bits. A judicious choice of I can provide the increased concurrency and bandwidth efficiency of independent subchannels, balanced against the cost of duplicating I address signals to each sub channel.

Figure 10A:
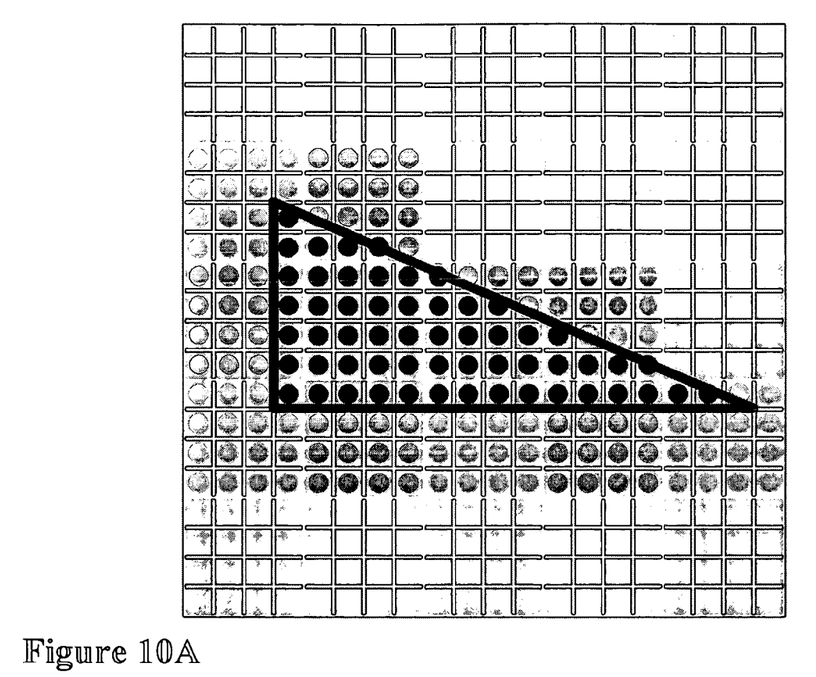
FIGS. 10A & 10B illustrate performance benefits.
Figure 10B:
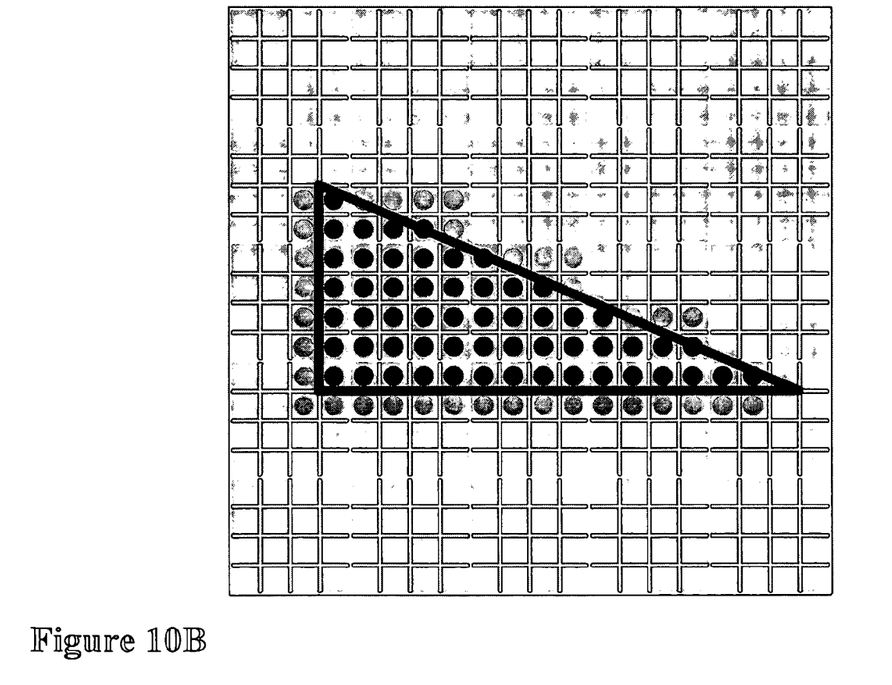

FIGS. 10A & 10B illustrate performance benefits for Micro-Tiling. Each figure shows the rasterization of a triangle in a tiled address space, with each small square representing a 4 byte pixel or texel. FIG. 10A shows overfetch in a standard memory system when requests are 64 bytes each. Each 4×4 block of pixels represents a 64 byte aligned block of memory. The triangle encompasses 57 pixels. With a standard memory subsystem, those 57 (pixels are in 11 (64 byte) blocks of memory. Thus, in order to access those 57 pixels, an additional 119 pixels worth of data is accessed that may not be used (e.g., resulting in 32% efficiency).

FIG. 10B shows the over fetch if requests are 16 bytes each and if all such requests can be utilized by the Micro-Tile Assembler to build 64 byte memory transactions with no unused subchannels. In this case, the triangle touches 23 2×2 pixel arrays, resulting in 35 additional pixels worth of data being accessed (e.g., resulting in 62% efficiency). The effectiveness of Micro-Tiling depends on the ability of the Assembler to construct fully populated memory transactions.

Further, the above-describe reorder table mechanism performs comparisons on incoming memory requests, instead of trying to build requests on the output side. This allows more time to perform the comparisons, potentially avoiding a race condition, and reduces the number of comparators (therefore reducing the overall gate count of the Reorder Queue). Instead of having S*D comparisons per clock there are only D comparisons per clock.

Figure 11:
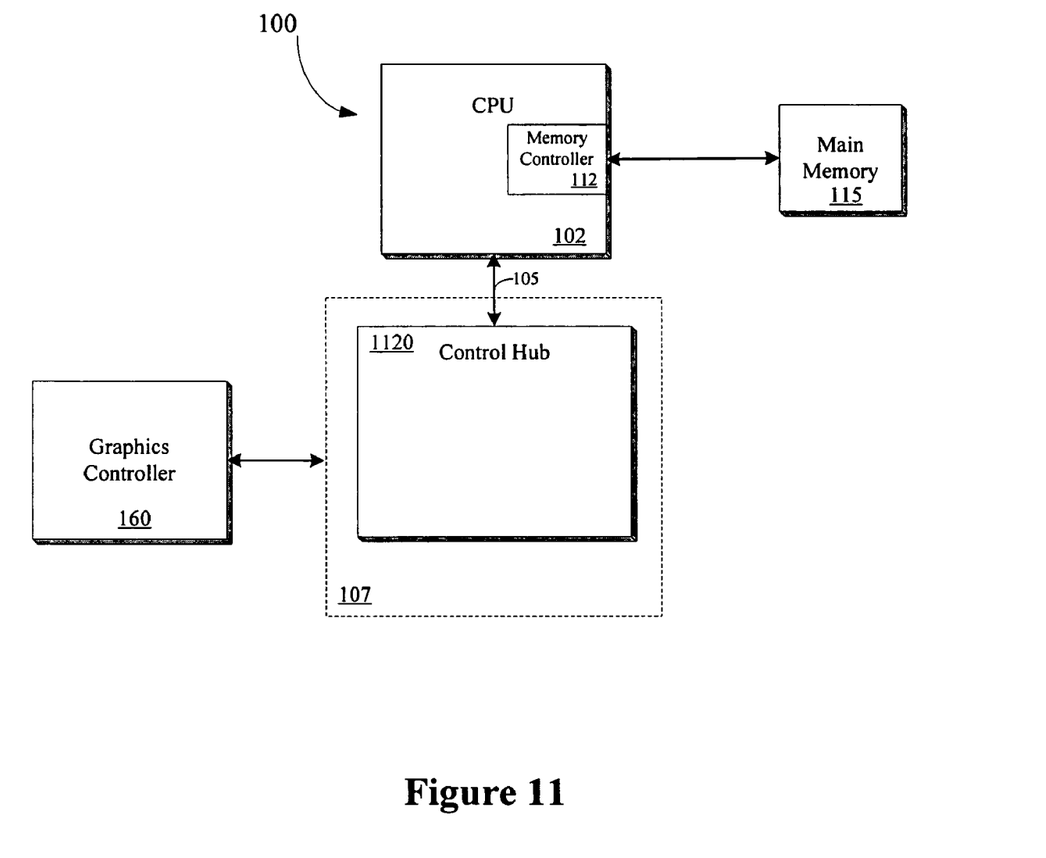
FIG. 11 is a block diagram of another embodiment of a computer system.

FIG. 11 illustrates another embodiment of computer system 100. In this embodiment, chipset 107 includes a single control hub 1120 as opposed to a separate memory control component and I/O control component. Consequently, memory controller 112 is included within CPU 102, with memory 115 being coupled to CPU 102. In such an embodiment, graphics controller 160 is coupled to control hub 1120 and accesses main memory 115 via CPU 102.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:
1. A memory controller comprising:
assignment logic to receive a first request and a second request to access a channel in a random access memory (RAM) device and to assign the first and second requests to access one of two or more independently addressable subchannels within the channel;

a reorder table having two or more table elements, each table element having a shared address component and an independent address component corresponding to each or the two or more independently addressable subchannels; and a transaction assembler to construct memory requests to the RAM device by combining the first request with one or more additional requests to access a first independently addressable subchannel within the channel and to combine the second request with one or more additional requests to access a second independently addressable subchannel within the channel.

2. The memory controller of claim 1 wherein each of the requests include an independent address value and a shared address value.

3. The memory controller of claim 2 wherein the shared address value of a request is compared to the shared address component stored in each table element.

4. The memory controller of claim 3 wherein the independent address value for the request is inserted in a corresponding independent address component of a table entry if there is a match between the shared address value of the request and the shared address component of the table entry and the corresponding independent address component of the table entry is empty.

5. The memory controller of claim 3 wherein the shared address value and the independent address value are stored in an empty table element.

6. The memory controller of claim 1 further comprising a transaction assembler to assemble the requests stored in the table elements to forward the subchannel requests to the associated subchannel.

7. The memory controller of claim 6 wherein a table element is returned to the reorder table as an empty table entry after a request has been forwarded to an associated subchannel.

8. The memory controller of claim 1 wherein each table element in the reorder table comprises a register to store the shared address component and the independent address component.

9. The memory controller of claim 8 wherein each register includes a valid bit to indicate if one or more of the stored values are valid.

10. The memory controller of claim 9 wherein the reorder table further comprises a comparator logic unit coupled to each of the registers.

11. A system comprising:

a random access memory (RAM) device having one or more channels; and a chipset, coupled to the memory device, having a memory controller including:

assignment logic to receive a first request and a second request to access a memory channel and to assign the first and second requests to access one of two or more independently addressable subchannels within the channel;

a reorder table having two or more table elements, each table element having a shared address component and an independent address component corresponding to each of the two or more independently addressable subchannels; and a transaction assembler to construct memory requests to the RAM device by combining the first request with one or more additional requests to access a first independently addressable subchannel within the channel and to combine the second request with one or more additional requests to access a second independently addressable subchannel within the channel.

12. The system of claim 11 wherein each of the subchannel requests include an independent address value and a shared address value.

13. The system controller of claim 12 wherein the shared address value of a subchannel request is compared to the shared address component stored in each table element.

14. The system of claim 13 wherein the independent address value for a subchannel request is inserted in a corresponding independent address component of a table entry if there is a match between the shared address value of, the subchannel request and the shared address component of the table entry.

15. The system of claim 11 further comprising a transaction assembler to assemble the subchannel requests stored in the table elements to forward the subchannel requests to the associated subchannel.

* * * * *